(12) United States Patent
Ikura

(10) Patent No.: US 8,878,407 B2
(45) Date of Patent: Nov. 4, 2014

(54) ROTARY ELECTRIC MACHINE AND METHOD FOR MANUFACTURING A STATOR COIL CONNECTING UNIT THEREFOR

(75) Inventor: Yutaka Ikura, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 337 days.

(21) Appl. No.: 13/450,098

(22) Filed: Apr. 18, 2012

(65) Prior Publication Data

US 2013/0113313 A1    May 9, 2013

(30) Foreign Application Priority Data

Nov. 9, 2011  (JP) ................................. 2011-245274

(51) Int. Cl.
*H02K 11/00*  (2006.01)
(52) U.S. Cl.
USPC .............................................. 310/71; 29/598
(58) Field of Classification Search
USPC ................. 310/71, 180, 184; 29/596
See application file for complete search history.

(56) References Cited

U.S. PATENT DOCUMENTS

| 6,369,473 | B1 * | 4/2002 | Baumeister et al. | 310/71 |
| 7,219,417 | B2 * | 5/2007 | Kobayashi et al. | 29/623 |
| 7,709,982 | B2 * | 5/2010 | Ohuchi et al. | 310/71 |

FOREIGN PATENT DOCUMENTS

| JP | 2003-134759 A | 5/2003 |
| JP | 2003-324883 A | 11/2003 |
| JP | 2008-312277 A | 12/2008 |

OTHER PUBLICATIONS

Japanese Office Action dated Aug. 20, 2013, issued in Japanese Patent Application No. 2011-245274.

* cited by examiner

*Primary Examiner* — Hanh Nguyen
(74) *Attorney, Agent, or Firm* — Sughrue Mion, PLLC; Richard C. Turner

(57) ABSTRACT

Busbars that are disposed so as to correspond to respective phases of a stator coil each include: a base portion that is formed so as to have an incomplete annular shape; external electric power supply terminals that extend radially inward from a first circumferential end of the base portion; and a plurality of coil connecting terminals that each extend radially outward from the base portion, that are arranged in a row so as to have a predetermined spacing in a circumferential direction of the base portion, and that are connected to coil terminals of concentrated winding coils, and the busbars are held by the electrically insulating holder such that the external electric power supply terminals extend radially inward so as to pass over omitted portions of the base portions of the busbars that are positioned radially inside the electrically insulating holder.

5 Claims, 13 Drawing Sheets

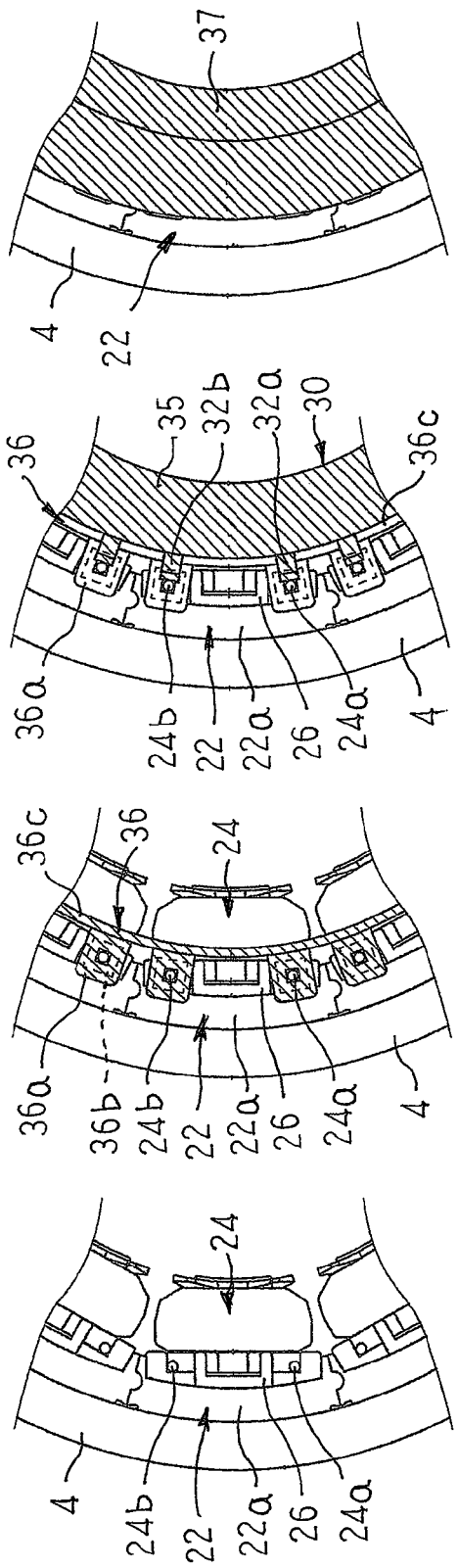

ROTARY ELECTRIC MACHINE AND METHOD FOR MANUFACTURING A STATOR COIL CONNECTING UNIT THEREFOR

BACKGROUND OF THE INVENTION

1. Field of the Invention

The present invention relates to a rotary electric machine that is used in an automotive motor, for example, and to a method for manufacturing a stator coil connecting unit therefor.

2. Description of the Related Art

Conventional centralized distribution members for motors include: a plurality of approximately annular busbars that have: terminal portions that are connected to a battery; and tabs that are connected to windings of a stator, and that are disposed so as to correspond to respective phases of a motor; an electrically insulating holder that has holding grooves that hold the approximately annular busbars, which are disposed so as to be laminated radially on the centralized distribution member, so as to be separated from each other by a predetermined spacing; a resin electrically insulating layer that is formed by insert molding, and that covers the respective busbars and the insulating holder, the terminal portions extending radially outward from the respective approximately annular busbars, and the tabs extending radially inward from the respective approximately annular busbars (see Patent Literature 1, for example).

Methods for manufacturing this conventional centralized distribution member for a motor have included a first bending step in which the terminal portions are bent outside the insulating holder; a second bending step in which the busbars are bent in thickness directions thereof so as to be made approximately annular; a step in which the approximately annular busbars are inserted into the plurality of holding grooves sequentially from those that are positioned on an outer circumferential side of the insulating holder; a third bending step in which the tabs are pointed inside the insulating holder after insertion of the respective busbars is completed; and a step in which insert molding is performed after completion of the respective bending steps.

Patent Literature 1: Japanese Patent Laid-Open No. 2003-134759 (Gazette)

Because conventional centralized distribution members for motors have configurations in which the terminal portions and the tabs extend outward from each of the approximately annular busbars in radially opposite directions, if the terminal portions and the tabs are both bent in steps before the approximately annular busbars are inserted into the holding grooves of the insulating holder, as the busbars are inserted into the holding grooves of the insulating holder, they interfere with the busbars that are already inserted into the holding grooves, and cannot be inserted into the holding grooves.

Thus, in conventional methods for manufacturing centralized distribution members for motors, only the terminal portions are bent in a step before the approximately annular busbars are inserted into the holding grooves of the insulating holder, and the tabs are bent in a reverse direction to the terminal portions after completion of insertion of the plurality of busbars into the plurality of holding grooves. However, one problem has been that bending of the tabs in a state in which the plurality of busbars are inserted into the respective holding grooves of the insulating holder is complicated bending, reducing ease of assembly of the centralized distribution member, and giving rise to cost increases.

SUMMARY OF THE INVENTION

The present invention aims to solve the above problems and an object of the present invention is to provide a rotary electric machine and a method for manufacturing a stator coil connecting unit therefor that can improve assembly and that can enable cost reductions by being constituted by: incomplete annular base portions from which a portion of a circular arc is omitted; external electric power supply terminals that extend outward on first sides in a radial direction from first sides in width directions of circumferential end portions of the base portions; and a plurality of coil connecting terminals that respectively extend outward on second sides in the radial direction from the first sides in the width directions of the base portions, and that are arranged circumferentially, in which busbars that are disposed so as to correspond to respective phases of the stator coil are mounted to an electrically insulating holder such that the external electric power supply terminals of the busbars that are positioned on the second side in the radial direction of the electrically insulating holder pass over the omitted portions of the base portions of the busbars that are positioned on the first side in the radial direction of the electrically insulating holder and extend outward on the first side in the radial direction to eliminate need for a step of bending the external electric power supply terminals or the coil connecting terminals after completion of mounting of the busbars onto the electrically insulating holder.

In order to achieve the above object, according to one aspect of the present invention, there is provided a rotary electric machine including: a housing including: a cylindrical frame; and a pair of brackets that are disposed on two axial ends of the cylindrical frame; a rotor that is disposed inside the housing such that a shaft is rotatably supported by the pair of brackets; a stator that includes: a stator core in which a plurality of teeth are each disposed so as to project radially inward from an inner circumferential wall surface of an annular core back, and are arranged in a row at a predetermined pitch circumferentially; and a stator coil that is constituted by a plurality of concentrated winding coils that are wound onto each of the teeth, the stator being held by the cylindrical frame so as to surround the rotor; and a connecting unit that is disposed at a first axial end of the stator, and that performs predetermined connection of the plurality of concentrated winding coils. The connecting unit includes: a plurality of busbars each including: a base portion that has a rectangular cross section that is formed by bending a flat strip in a thickness direction into an incomplete annular shape from which a portion of a circular arc is omitted; an external electric power supply terminal that has a rectangular cross section that is bent in the thickness direction from a first side in a width direction of a circumferential end portion of the base portion to extend outward on a first side in the radial direction; and a plurality of coil connecting terminals that have rectangular cross sections that are each bent in the thickness direction from the first side in the width direction of the base portion to extend outward on a second side in the radial direction, that are arranged in a row so as to have a predetermined spacing in a circumferential direction of the base portion, and that are connected to coil terminals of the concentrated winding coils, the plurality of busbars being disposed so as to correspond respective phases of the stator coil; and an annular electrically insulating holder in which a plurality of busbar housing grooves are formed concentrically, and that holds the plurality of busbars by housing the base portions in each of the plurality of busbar housing grooves. The plurality of busbars are held by the electrically insulating holder such that the external electric power supply terminals extend outward on the first side in the radial direction so as to pass over the omitted portions of the base portions of the busbars that are positioned on the first side in the radial direction of the electrically insulating holder.

According to the present invention, because the plurality of busbars are held by the electrically insulating holder such that the external electric power supply terminals pass over the omitted portions of the base portions of the busbars that are positioned on the first side in the radial direction of the electrically insulating holder and extend outward on the first side in the radial direction, the plurality of busbars, which are bent such that the external electric power supply terminals and the coil connecting terminals extend outward from the base portions in radially opposite directions, can be mounted onto the electrically insulating holder without interfering with each other. Thus, complicated bending steps in which the external electric power supply terminals and the coil connecting terminals are bent after mounting the busbars onto the electrically insulating holder are no longer required, enabling assembly of the connecting unit of the stator coil to be improved, and also enabling cost reductions.

BRIEF DESCRIPTION OF THE DRAWINGS

FIGS. 13A through 13D are partial end elevations that explain a method for assembling a connecting unit onto the stator in the rotary electric machine according to Embodiment 1 of the present invention;

DETAILED DESCRIPTION OF THE PREFERRED EMBODIMENTS

Preferred embodiments of a rotary electric machine and a method for manufacturing a stator coil connecting unit therefor according to the present invention will now be explained using the drawings.

Embodiment 1

Figure 1:
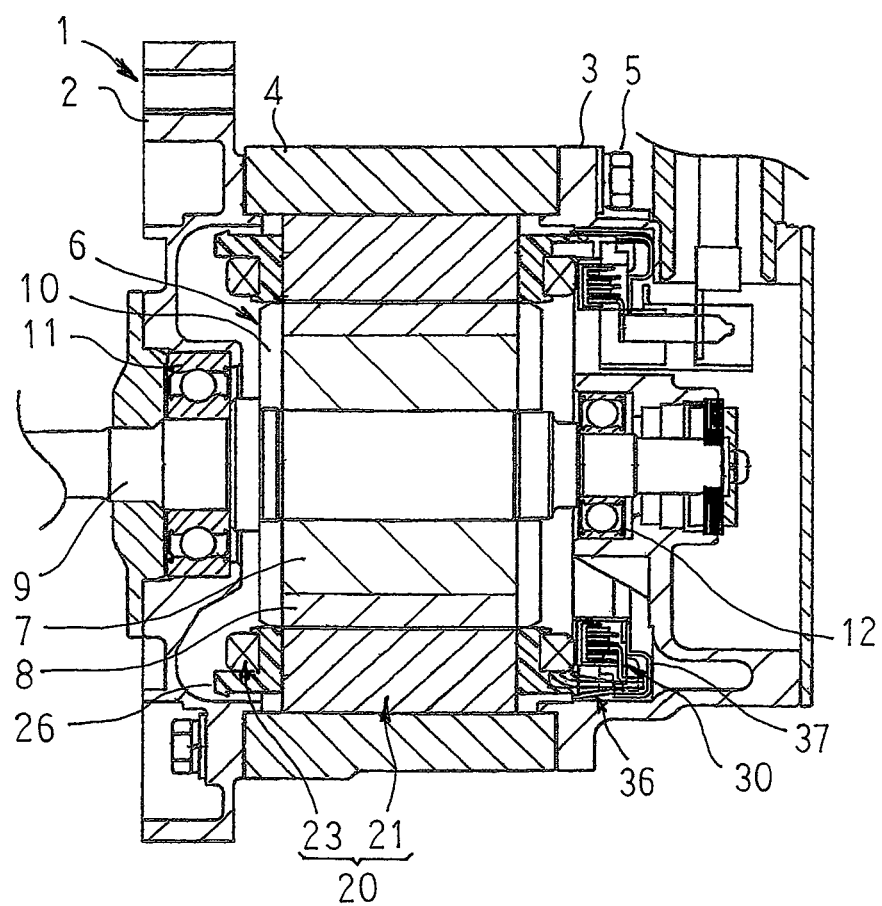
FIG. 1 is a cross section that shows a rotary electric machine according to Embodiment 1 of the present invention.
Figure 2:
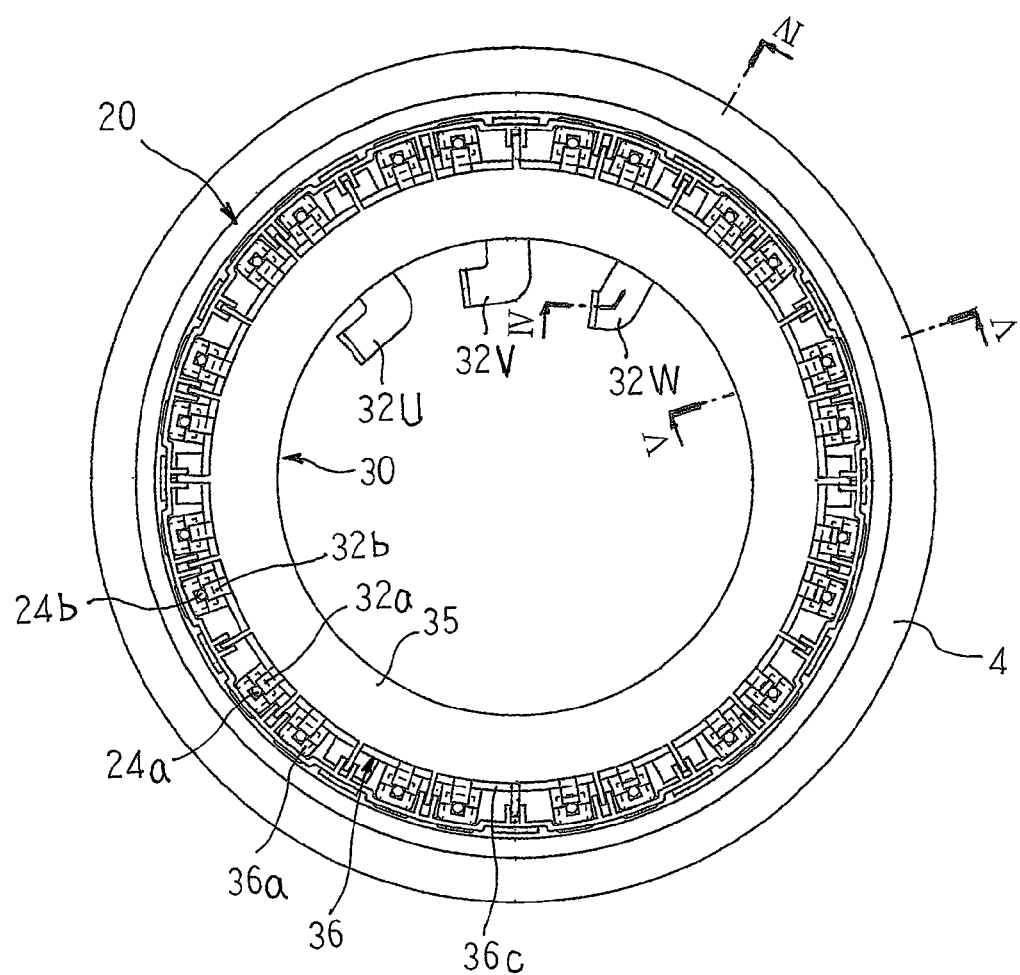
FIG. 2 is an end elevation that shows a mounted state of a connecting unit of a stator of the rotary electric machine according to Embodiment 1 of the present invention.
Figure 3:
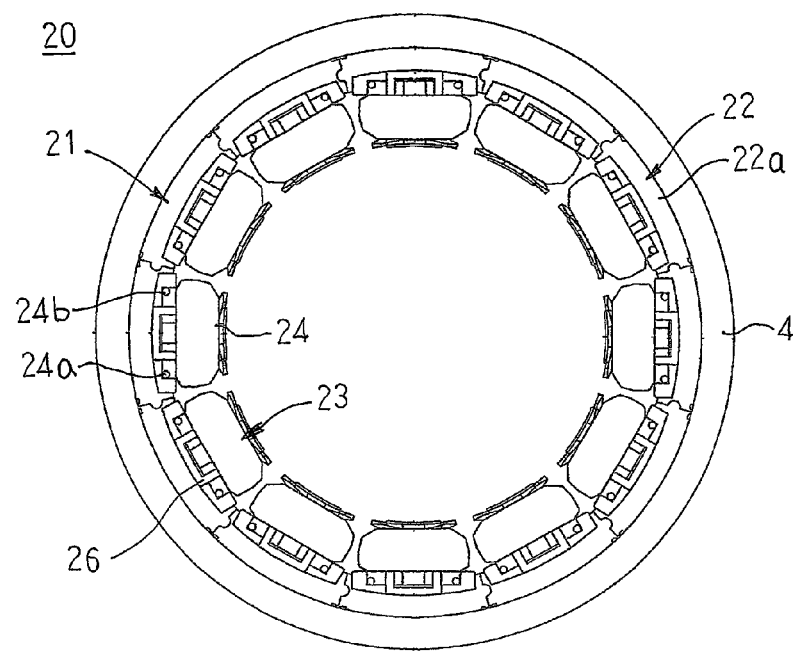
FIG. 3 is an end elevation that shows the stator of the rotary electric machine according to Embodiment 1 of the present invention.
Figure 4:
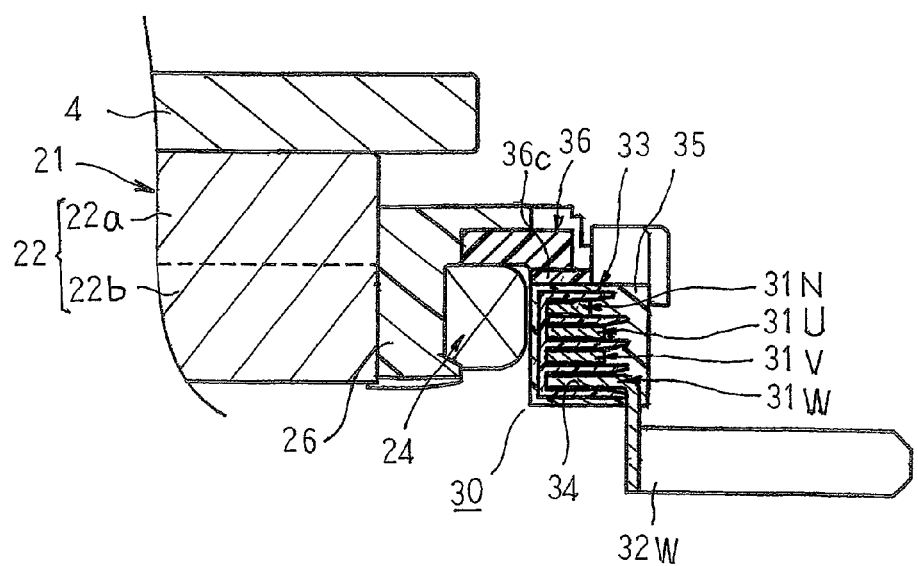
FIG. 4 is a cross section that is taken along Line IV-IV in FIG. 2 so as to be viewed in the direction of the arrows.
Figure 5:
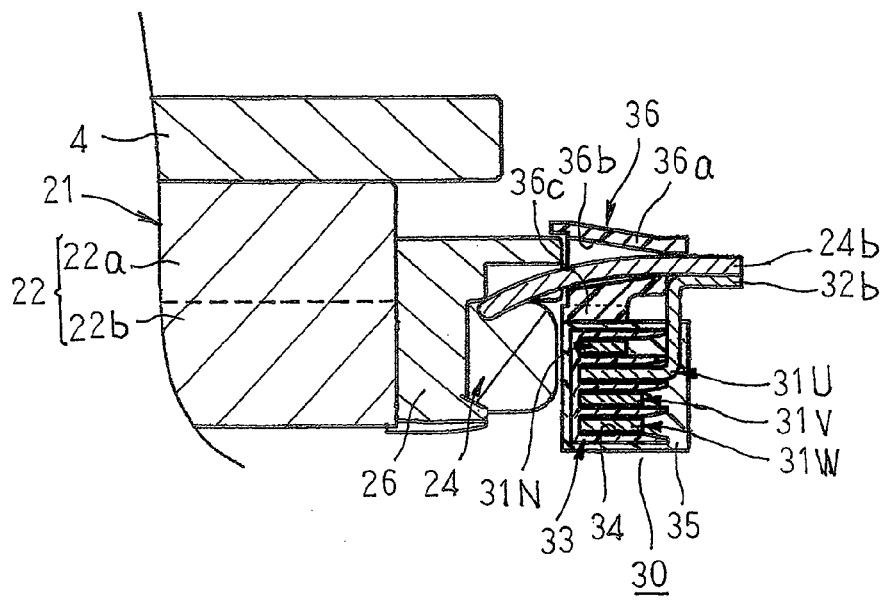
FIG. 5 is a cross section that is taken along Line V-V in FIG. 2 so as to be viewed in the direction of the arrows.
Figure 6:
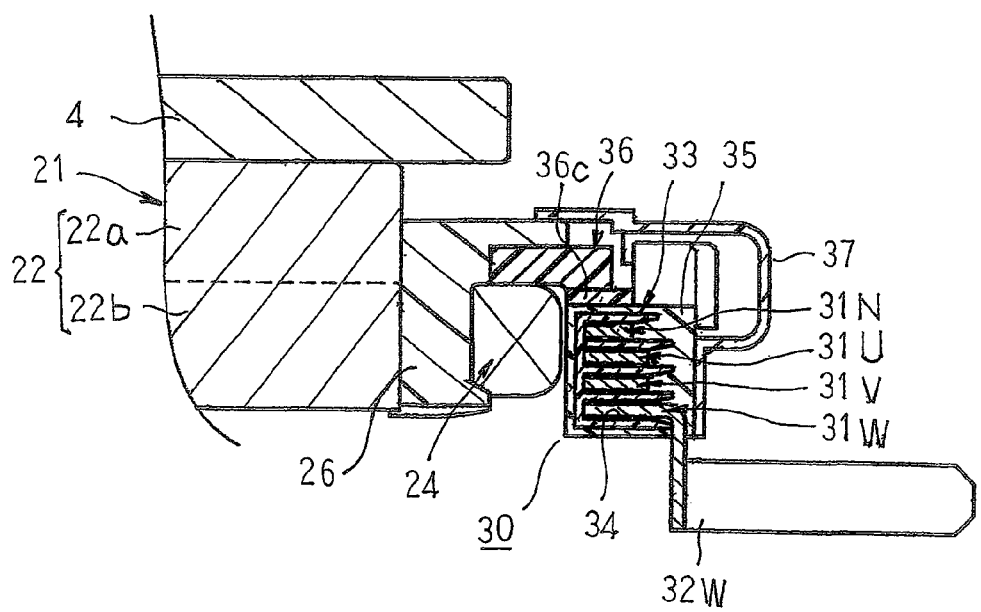
FIG. 6 is a partial cross section that shows a mounted state of a cover of the stator of the rotary electric machine according to Embodiment 1 of the present invention.
Figure 7:
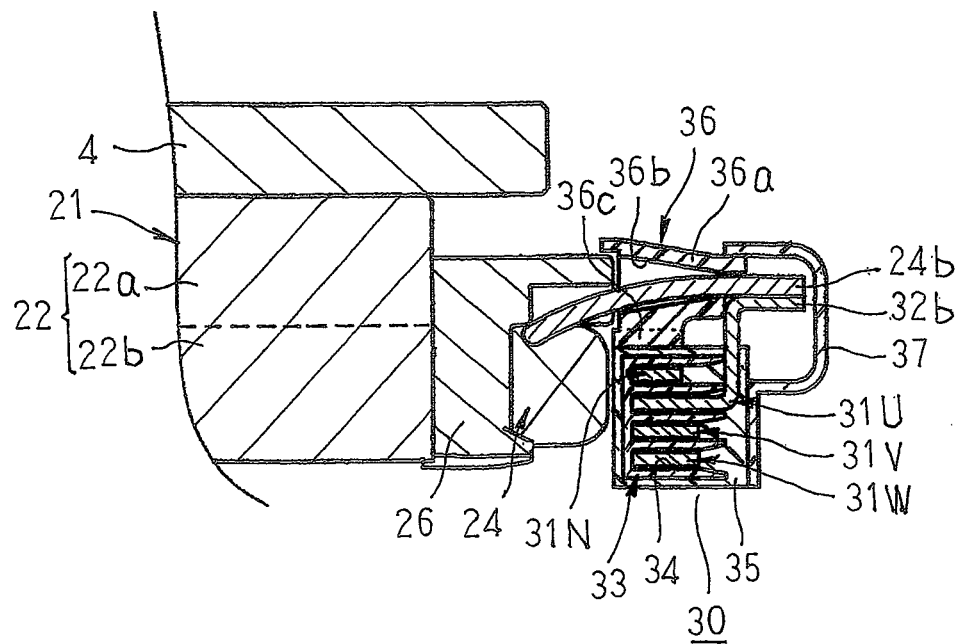
FIG. 7 is a partial cross section that shows the mounted state of the cover of the stator of the rotary electric machine according to Embodiment 1 of the present invention.
Figure 8:
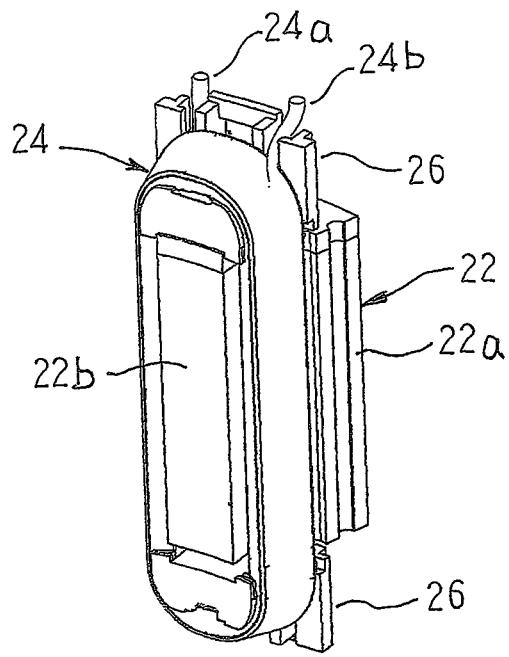
FIG. 8 is a perspective that shows a core unit of the stator of the rotary electric machine according to Embodiment 1 of the present invention.
Figure 9:
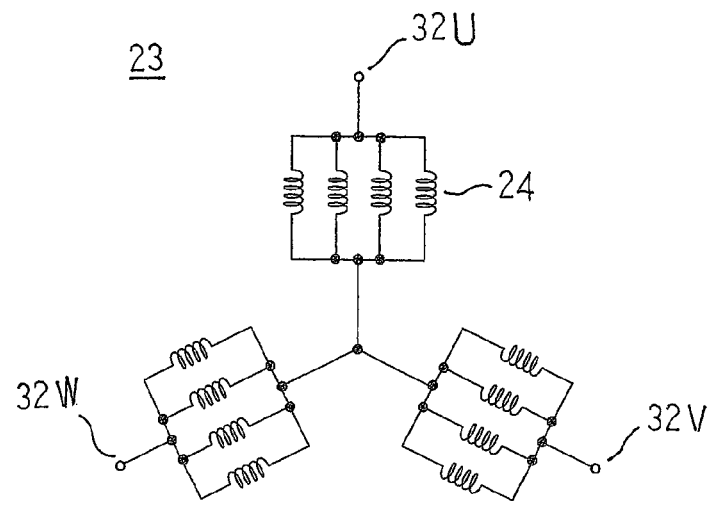
FIG. 9 is a connection diagram of stator coil of the rotary electric machine according to Embodiment 1 of the present invention.
Figure 10:
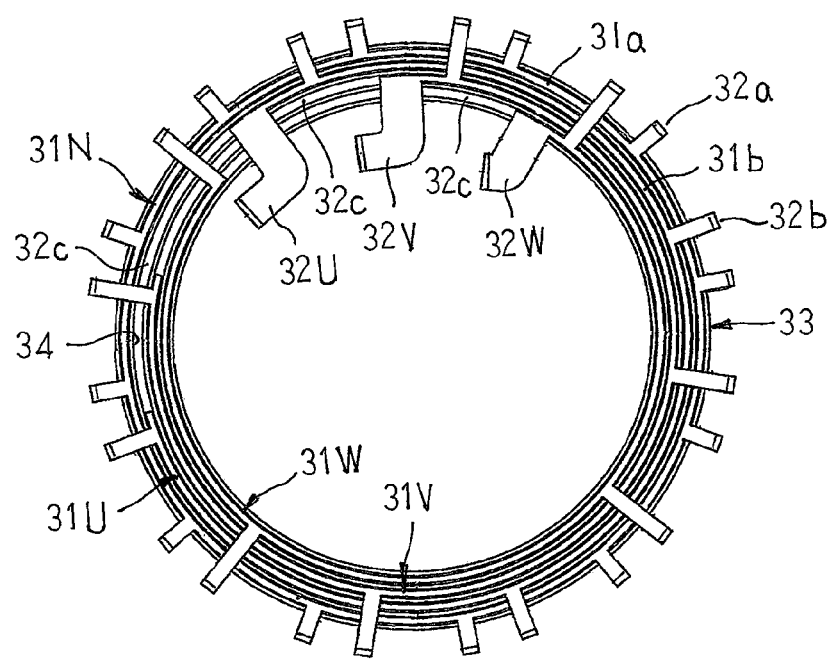
FIG. 10 is an end elevation that shows a state of the connecting unit of the stator coil of the rotary electric machine according to Embodiment 1 of the present invention before insert molding.
Figure 14A:
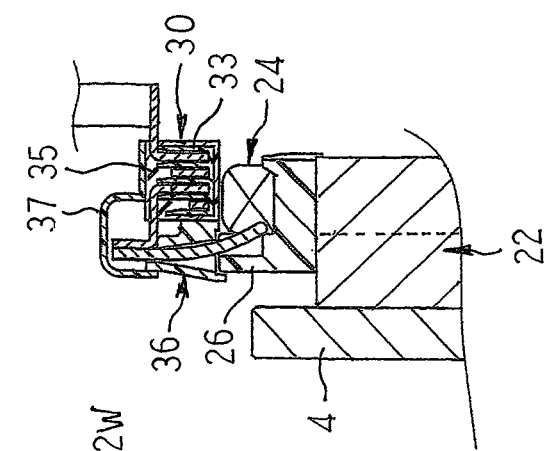
FIGS. 14A through 14D are partial cross sections that explain a method for assembling a connecting unit onto the stator in the rotary electric machine according to Embodiment 1 of the present invention.
Figure 14B:
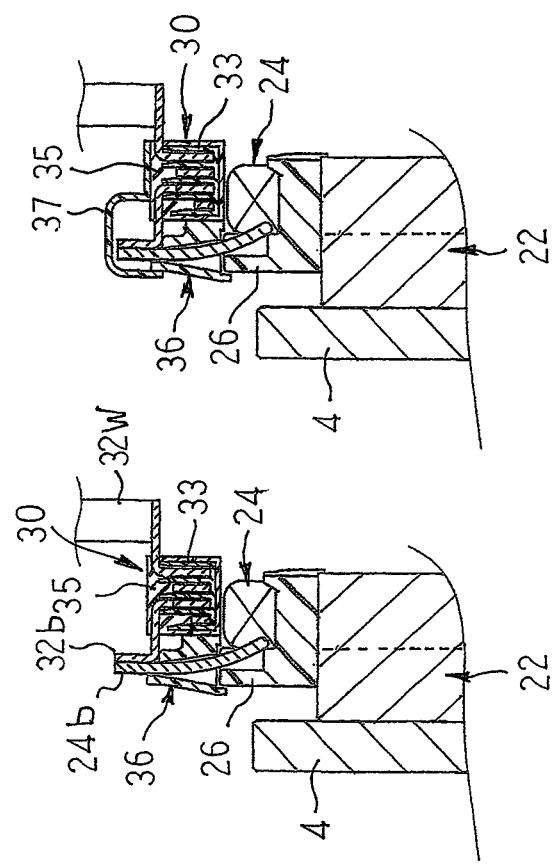
Figure 14C:
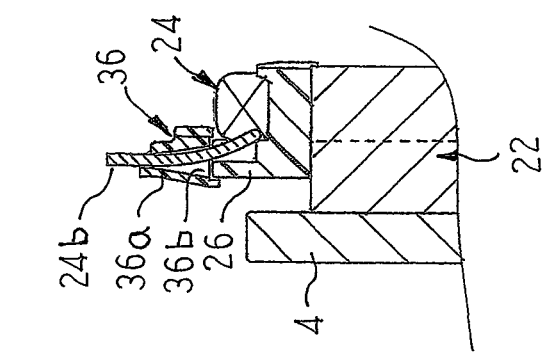
Figure 14D:
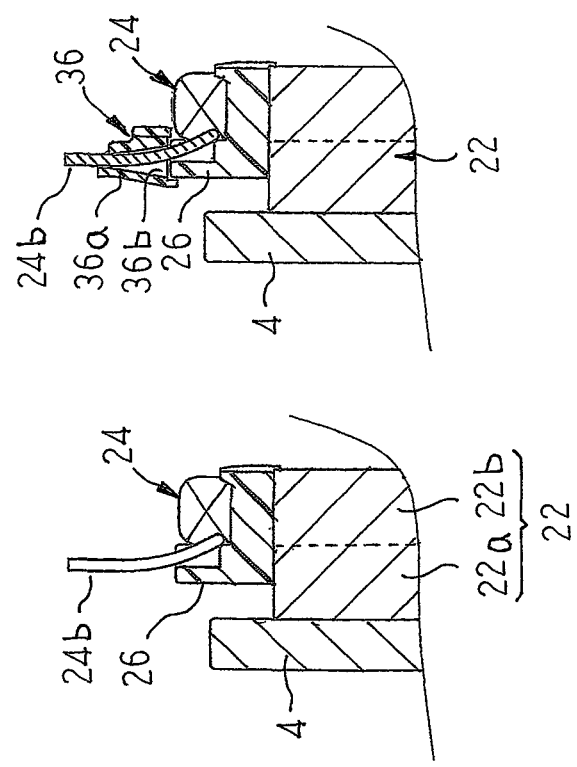
Figure 15A:
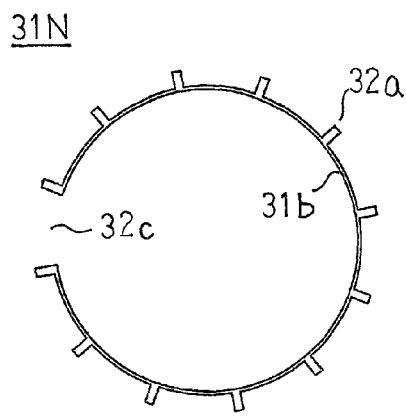
FIGS. 15A and 15B are end elevations that show variations of neutral-point connection busbars that are used in the connecting unit of the stator coil of the rotary electric machine according to Embodiment 1 of the present invention.
Figure 15B:
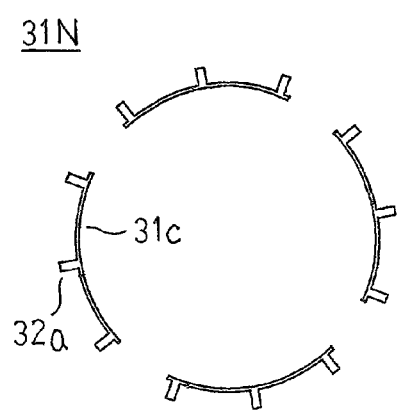

FIG. 1 is a cross section that shows a rotary electric machine according to Embodiment 1 of the present invention, FIG. 2 is an end elevation that shows a mounted state of a connecting unit of a stator of the rotary electric machine according to Embodiment 1 of the present invention, FIG. 3 is an end elevation that shows the stator of the rotary electric machine according to Embodiment 1 of the present invention, FIG. 4 is a cross section that is taken along Line IV-IV in FIG. 2 so as to be viewed in the direction of the arrows, FIG. 5 is a cross section that is taken along Line V-V in FIG. 2 so as to be viewed in the direction of the arrows, FIGS. 6 and 7 are respective partial cross sections that show a mounted state of a cover of the stator of the rotary electric machine according to Embodiment 1 of the present invention, FIG. 8 is a perspective that shows a core unit of the stator of the rotary electric machine according to Embodiment 1 of the present invention, FIG. 9 is a connection diagram of stator coil of the rotary electric machine according to Embodiment 1 of the present invention, FIG. 10 is an end elevation that shows a state of the connecting unit of the stator coil of the rotary electric machine according to Embodiment 1 of the present invention before insert molding, FIGS. 11A through 11D are end elevations that show busbars that are used in the connecting unit of the stator coil of the rotary electric machine according to Embodiment 1 of the present invention, FIGS. 12A through 12D are process diagrams that explain a method for forming a busbar that is used in the connecting unit of the stator coil of the rotary electric machine according to Embodiment 1 of the present invention, FIGS. 13A through 13D are partial end elevations that explain a method for assembling a connecting unit onto the stator in the rotary electric machine according to Embodiment 1 of the present invention, FIGS. 14A through 14D are partial cross sections that explain a method for assembling a connecting unit onto the stator in the rotary electric machine according to Embodiment 1 of the present invention, and FIGS. 15A and 15B are end elevations that show variations of neutral-point connection busbars that are used in the connecting unit of the stator coil of the rotary electric machine according to Embodiment 1 of the present invention. Moreover, FIGS. 6 and 7 show a mounted state of the cover in the partial cross sections that are shown in FIGS. 4 and 5, respectively.

In FIG. 1, a rotary electric machine 100 includes: a housing 1; a rotor 6 that is rotatably disposed inside the housing 1; a stator 20 that is held inside the housing 1 so as to surround the rotor 6; and a connecting unit 30 that is disposed at the first axial end of the stator 20.

The housing 1 includes: first and second brackets 2 and 3; and a metal cylindrical frame 4 that is held between the first and second brackets 2 and 3 from two axial ends, and that is held on the first and second brackets 2 and 3 by a fastening force from a bolt 5 that fastens the first and second brackets 2 and 3.

The rotor 6 includes, for example: a rotor core 7 in which eight permanent magnets 8 that function as poles are fixed to an outer circumferential surface by adhesion, etc.; a shaft 9 that is inserted through and fixed to a central axial position of the rotor core 7; and cooling fans 10 that are fixed to two axial end surfaces of the rotor core 7. The rotor 6 is rotatably disposed inside the housing 1 such that the shaft 9 is rotatably supported by first and second bearings 11 and 12 that are disposed on the first and second brackets 2 and 3.

The stator 20 includes: an annular stator core 21; and a stator coil 23 that is mounted onto the stator core 21. As described below, the stator coil 23 is constituted by twelve concentrated winding coils 24, the twelve concentrated winding coils 24 are connected by the connecting unit 30, which is disposed on an axial end of the stator 20, and as shown in FIG. 9, are configured into a three-phase alternating-current winding that is formed by wye-connecting a U-phase winding, a V-phase winding, and a W-phase winding in each of which four concentrated winding coils 24 are connected in parallel.

Next, configuration of the stator 20 will be explained in detail.

As shown in FIGS. 3 and 8, the stator core 21 is configured annularly such that twelve core blocks 22 are arranged circumferentially, the core blocks 22 having T-shaped cross sections that are constituted by: a core back portion 22a that has a circular arc-shaped cross section; and a tooth 22b that is disposed so as to project radially inward from a circumferentially-central portion of an inner circumferential surface of the core back portion 22a.

Coil bobbins 26 are resin-molded bodies of an electrically insulating resin such as a nylon, and are disposed on two axial ends of the core blocks 22. As shown in FIG. 8, the concentrated winding coils 24 are formed by winding a conductor wire that is coated with an insulator for a predetermined number of winds around the tooth 22b of the core block 22 and the coil bobbins 26.

The stator 20 is formed by inserting the twelve core blocks 22 onto which the concentrated winding coils 24 are wound into the cylindrical frame 4 so as to be arranged circumferentially such that the circumferential side surfaces of the core back portions 22a are abutted to each other, and fixing them by shrinkage fitting, etc. In a stator 20 that is configured in this manner, two coil terminals 24a and 24b extend outward at a first axial end from the respective concentrated winding coils 24. The core back portions 22a are arranged so as to line up circumferentially to constitute an annular core back of the stator core 21.

Next, configuration of the connecting unit 30 will be explained using FIGS. 4, 5, 10, and 11A through 11D.

As shown in FIGS. 4, 5, and 10, the connecting unit 30 includes: a plurality of busbars 31N, 31U, 31V, and 31W that perform predetermined connection of the concentrated winding coils 24; an electrically insulating holder 33 that houses and holds the plurality of busbars 31N, 31U, 31V, and 31W; and an exterior molded member 35 that is formed so as to embed the electrically insulating holder 33 in which the busbars 31N, 31U, 31V, and 31W are housed and held by insert molding.

Figure 11A:
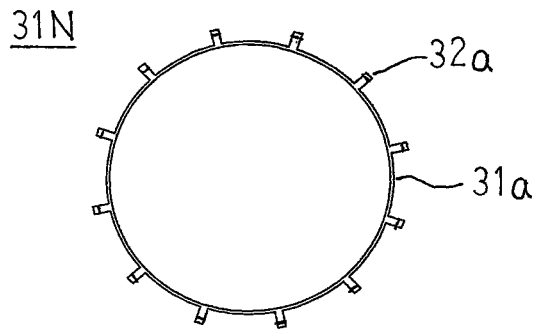
FIGS. 11A through 11D are end elevations that show busbars that are used in the connecting unit of the stator coil of the rotary electric machine according to Embodiment 1 of the present invention.

The busbar 31N is a neutral-point connecting busbar, and as shown in FIG. 11A, includes: an annular base portion 31a that is formed by bending a flat strip in a thickness direction; and twelve coil connecting terminals 32a that are respectively bent in the thickness direction from a first side in a width direction of the base portion 31a so as to extend radially outward and that are arranged at a uniform angular pitch circumferentially.

Figure 11B:
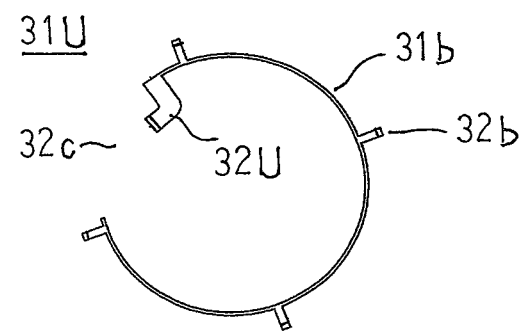

The busbar 31U is a U-phase connecting busbar, and as shown in FIG. 11B, includes: an incomplete annular base portion 31b that is smaller in diameter than the base portion 31a of the busbar 31N, that is formed by bending a flat strip in a thickness direction, and that has an omitted portion 32c from which a portion of a circular arc is omitted; four coil connecting terminals 32b that are respectively bent in the thickness direction from the first side in the width direction of the base portion 31b so as to extend radially outward and that are arranged at a uniform angular pitch circumferentially; and an external electric power supply terminal 32U that is bent in the thickness direction from the first side in the width direction of a first circumferential end of the base portion 31b to extend radially inward.

Figure 11C:
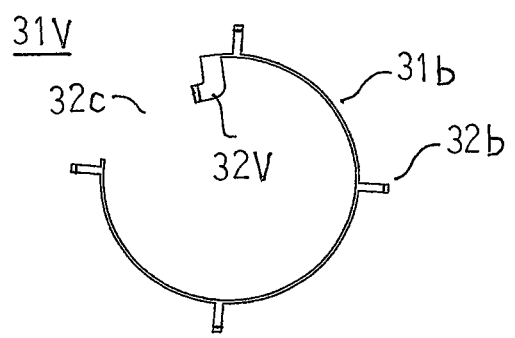

The busbar 31V is a V-phase connecting busbar, and as shown in FIG. 11C, includes: an incomplete annular base portion 31b that is smaller in diameter than the base portion 31b of the busbar 31U, that is formed by bending a flat strip in a thickness direction, and that has an omitted portion 32c from which a portion of a circular arc is omitted; four coil connecting terminals 32b that are respectively bent in the thickness direction from the first side in the width direction of the base portion 31b so as to extend radially outward and that are arranged at a uniform angular pitch circumferentially; and an external electric power supply terminal 32V that is bent in the thickness direction from the first side in the width direction of a first circumferential end of the base portion 31b to extend radially inward.

Figure 11D:
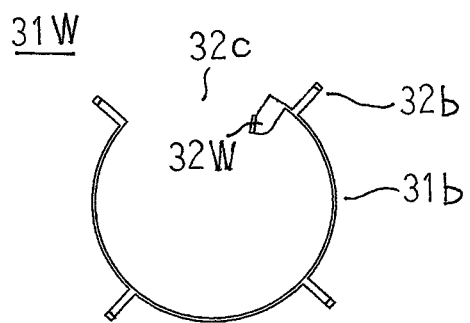

The busbar 31W is a W-phase connecting busbar, and as shown in FIG. 11D, includes: an incomplete annular base portion 31b that is smaller in diameter than the base portion 31b of the busbar 31V, that is formed by bending a flat strip in a thickness direction, and that has an omitted portion 32c from which a portion of a circular arc is omitted; four coil connecting terminals 32b that are respectively bent in the thickness direction from the first side in the width direction of the base portion 31b so as to extend radially outward and that are arranged at a uniform angular pitch circumferentially; and an external electric power supply terminal 32W that is bent in the thickness direction from the first side in the width direction of a first circumferential end of the base portion 31b to extend radially inward.

Moreover, the circumferential direction of the base portions 31a and 31b corresponds to a longitudinal direction of the flat strip, and the thickness direction and width direction of the base portions 31a and 31b correspond to directions that are parallel to the short sides and the long sides in a rectangular cross section that is perpendicular to the longitudinal direction of the flat strip.

The coil terminals 24a of the concentrated winding coils 24 are connected to the coil connecting terminals 32a, and the coil terminals 24b are connected to the coil connecting terminals 32b.

A method for manufacturing the busbar 31U using a pressing machine (not shown) will now be explained with reference to FIG. 12.

Figure 12A:
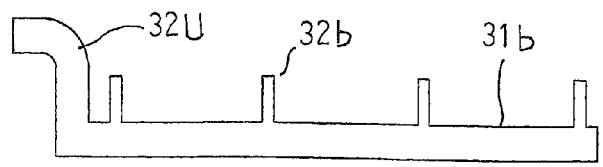
FIGS. 12A through 12D are process diagrams that explain a method for forming a busbar that is used in the connecting unit of the stator coil of the rotary electric machine according to Embodiment 1 of the present invention.
Figure 12B:
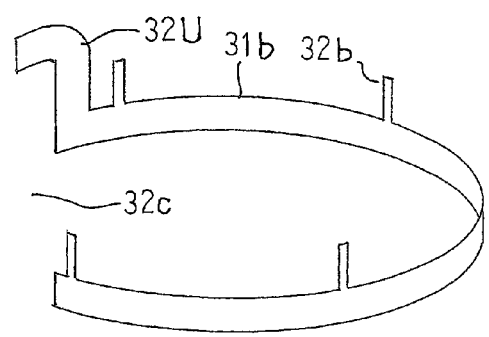
Figure 12C:
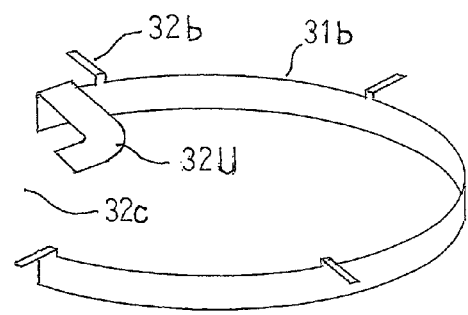
Figure 12D:
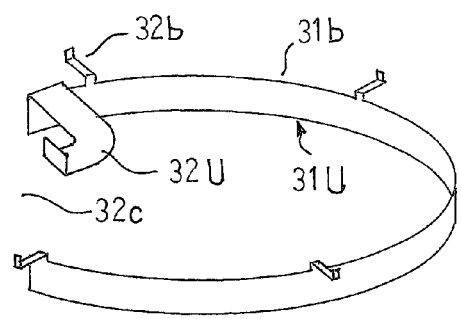

First, as shown in FIG. 12A, a flat strip base portion 31b that has a predetermined length from which the coil connecting terminals 32b and the external electric power supply terminal 32U extend outward on the first side in the width direction is punched from a strip-shaped electrically conductive member that is made from a copper sheet, etc., that has a sheet thickness of approximately 1 mm. Next, as shown in FIG. 12B, the base portion 31b is bent in the thickness direction to form the incomplete annular shape from which the portion of the circular arc is omitted. Next, as shown in FIG. 12C, the respective coil connecting terminals 32b are bent perpendicular to the thickness direction so as to extend radially outward, and the external electric power supply terminal 32U is bent perpendicular to the thickness direction so as to extend radially inward. In addition, as shown in FIG. 12D, the respective tip end portions of the coil connecting terminals 32b and the external electric power supply terminal 32U are bent perpendicular to the thickness direction to obtain the busbar 31U. Moreover, the base portion 31b, the coil connecting terminals 32b, and the external electric power supply terminal 32U have rectangular cross sections (oblong cross sections).

Moreover, to facilitate explanation, the step of manufacturing the busbar 31U has been explained as being divided into a plurality of steps, but the step of bending the base portion 31b, and the steps of bending the coil connecting terminals 32 and the external electric power supply terminal 32U may also be performed simultaneously.

Because the busbars 31N, 31V, and 31W are also formed similarly using a pressing machine, explanation thereof will be omitted here.

As shown in FIGS. 4, 5, and 10, the electrically insulating holder 33 is formed annularly using an electrically insulating resin such as a nylon, and four annular busbar housing grooves 34 are formed concentrically thereon. The four busbar housing grooves 34 are respectively formed on the electrically insulating holder 33 so as to be able to house the base portions 31a and 31b of the busbars 31N, 31U, 31V, and 31W.

The busbar 31N is mounted onto the electrically insulating holder 33 by inserting the base portion 31a thereof into the busbar housing groove 34 that is positioned at the outermost circumference. Next, the busbar 31U is mounted onto the electrically insulating holder 33 by inserting the base portion 31b thereof into the second busbar housing groove 34 from the outer circumferential side. Next, the busbar 31V is mounted onto the electrically insulating holder 33 by inserting the base portion 31b thereof into the third busbar housing groove 34 from the outer circumferential side such that the external electric power supply terminal 32U is inserted into the omitted portion 32c of the base portion 31b. In addition, the busbar 31W is mounted onto the electrically insulating holder 33 by inserting the base portion 31b thereof into the fourth busbar housing groove 34 from the outer circumferential side such that the external electric power supply terminals 32U and 32V are inserted into the omitted portion 32c of the base portion 31b.

The busbars 31N, 31U, 31V, and 31W are thereby assembled onto the electrically insulating holder 33, as shown in FIG. 10. Thus, twelve pairs of coil connecting terminals 32a and 32b that extend radially outward from the electrically insulating holder 33 are arranged at a uniform angular pitch. The external electric power supply terminal 32U extends radially inward from the electrically insulating holder 33 so as to pass over the omitted portions 32c of the base portions 31b of the busbars 31V and 31W, and the external electric power supply terminal 32V extends radially inward from the electrically insulating holder 33 so as to pass over the omitted portion 32c of the base portion 31b of the busbar 31W.

Next, the electrically insulating holder 33 on which the busbars 31N, 31U, 31V, and 31W are assembled is inserted into a mold that has a parting direction in an axial direction of the electrically insulating holder 33. Two flat surfaces that are constituted by the long sides of the rectangular cross sections of the coil connecting terminals 32a and 32b and the external electric power supply terminal 32U, 32V, and 32W are held by mating surfaces of the mold, and the connecting unit 30 is formed by insert-molding using an electrically insulating resin such as a nylon. The electrically insulating holder 33, the base portions 31a and 31b, the root regions of the coil connecting terminals 32a and 32b and the root regions of the external electric power supply terminal 32U, 32V, and 32W are thereby embedded in the annular exterior molded member 35, the coil connecting terminals 32a and 32b extend radially outward from outer circumferential wall surfaces of the exterior molded member 35, and the external electric power supply terminals 32U, 32V, and 32W extend radially inward from inner circumferential wall surfaces of the exterior molded member 35. In addition, the two flat surfaces that are constituted by the long sides of the rectangular cross sections of the coil connecting terminals 32a and 32b and the external electric power supply terminals 32U, 32V, and 32W that extend out from the exterior molded member 35 are flush with each other.

The coil terminal guiding member 36 is a resin-molded body that is made of an electrically insulating resin such as a nylon, and as shown in FIGS. 5 and 13B, includes: twenty-four guiding portions 36a that are arranged in a row circumferentially so as to face the coil terminals 24a and 24b, and that each have a splayed guiding aperture 36b; and an annular linking portion 36c that links and holds the guiding portions 36a integrally. The guide portions 36a are held by the linking portions 36c such that apertures near tapered ends of the guiding apertures 36b thereof are positioned in a vicinity of the radially outer ends of the projecting ends of the coil connecting terminals 32a and 32b that are arranged in a row in a circumferential direction of the connecting unit 30.

A cover 37 is formed using an electrically insulating resin such as a nylon into an annular shape that covers joining portions between the coil terminals 24a and 24b and the coil connecting terminals 32a and 32b.

A procedure for connecting the concentrated winding coils 24 of the stator 20 using a connecting unit 30 that is configured in this manner will be explained with reference to FIGS. 13 and 14.

First, the stator 20 is assembled. A partial end elevation of the stator 20 is shown in FIG. 13A, and a partial cross section is shown in FIG. 14A.

Next, a coil terminal guiding member 36 is moved close to the first axial end surface of the stator 20 from an axial direction such that the splayed ends of the guiding apertures 36b face toward the stator 20. Thus, as shown in FIGS. 13B and 14B, the coil terminals 24a and 24b extend outward from the guiding portions 36a so as to pass through the guiding apertures 36b.

Next, the connecting unit 30 is moved toward the first axial end surface of the stator 20 from an axial direction such that the coil connecting terminals 32a and 32b are positioned circumferentially so as to face the coil terminals 24a and 24b that extend outward from the guiding portions 36a. Thus, as shown in FIGS. 13C and 14C, the connecting unit 30 is disposed axially outside the concentrated winding coils 24 and radially inside the coil terminal guiding member 36 so as to be in contact with the concentrated winding coils 24. Here, the connecting unit 30 is positioned radially inside the core back of the stator core 21, i.e., the core back portions 22a of the core blocks 22.

Next, the coil terminals 24a and 24b and the coil connecting terminals 32a and 32b are joined by welding, etc., to join the connecting unit 30 to the first axial end of the stator 20 as shown in FIG. 2. Thus, the twelve concentrated winding coils 24 are connected by the connecting unit 30, and are configured into a three-phase alternating-current winding that is formed by wye-connecting a U-phase winding, a V-phase winding, and a W-phase winding in each of which four concentrated winding coils 24 are connected in parallel, as shown in FIG. 9.

In addition, as shown in FIGS. 13D and 14D, the cover 37 is mounted to the connecting unit 30 from an axial direction. Thus, as shown in FIGS. 6 and 7, the connecting unit 30 and the junction portions between the coil connecting terminals 32a and 32b and the coil terminals 24a and 24b are covered by the cover 37.

In a rotary electric machine 100 that is configured in this manner, alternating-current electric power is supplied from an external electric power supply to the stator coil 23 by means of the external electric power supply terminals 32U, 32V, and 32W, to drive the rotor 6 to rotate. This rotary electric machine 100 operates as an inner-rotor three-phase motor in which the number of magnetic poles is eight, and the number of slots is twelve.

According to Embodiment 1, the busbar 31N includes: an annular base portion 31a; and twelve coil connecting terminals 32a that extend radially outward from the first side in the width direction of the base portion 31a and that are arranged at a uniform angular pitch circumferentially. The busbars 31U, 31V and 31W include: incomplete annular base portions 31b that have omitted portions 32c; four coil connecting terminals 32b that extend radially outward from the first side in the width direction of the base portion 31b and that are arranged at a uniform angular pitch circumferentially; and external electric power supply terminals 32U, 32V, and 32W that extend radially inward from the first side in the width direction of a first circumferential end of the base portion 31b.

The busbar 31N is mounted onto the electrically insulating holder 33 by inserting the base portion 31a into the busbar housing groove 34 at the outermost circumference of the electrically insulating holder 33, and then the busbar 31U is mounted onto the electrically insulating holder 33 by inserting the base portion 31b into the second busbar housing groove 34 from the outer circumferential side. Next, the busbar 31V is mounted onto the electrically insulating holder 33 by inserting the base portion 31b into the third busbar housing groove 34 from the outer circumferential side such that the external electric power supply terminal 32U of the busbar 31U that is already mounted is inserted into the omitted portion 32c of the base portion 31b. In addition, the busbar 31W is mounted onto the electrically insulating holder 33 by inserting the base portion 31b thereof into the fourth busbar housing groove 34 from the outer circumferential side such that the external electric power supply terminals 32U and 32V of the busbars 31U and 31V that are already mounted are inserted into the omitted portion 32c of the base portion 31b.

According to this assembly procedure, the busbars 31N, 31U, 31V, and 31W, in which the coil connecting terminals 32a and 32b are bent radially outward and the external electric power supply terminals 32U, 32V, and 32W are bent radially inward, can be mounted onto the electrically insulating holder 33 without interfering with each other. Thus, complicated bending steps in which the coil connecting terminals 32a and 32b or the external electric power supply terminals 32U, 32V, and 32W are bent after mounting the busbars 31N, 31U, 31V, and 31W into the electrically insulating holder 33, and jigs that are used in the bending steps, etc., are no longer necessary, improving assembly of the connecting unit 30, and enabling costs to be reduced.

Because the coil connecting terminals 32a and 32b and the external electric power supply terminals 32U, 32V, and 32W are bent before the busbars 31N, 31U, 31V, and 31W are mounted onto the electrically insulating holder 33, dimensional precision of the bent portions is increased.

The coil connecting terminals 32a and 32b and the external electric power supply terminals 32U, 32V, and 32W are bent perpendicular to the thickness directions of the base portions 31a and 31b. Thus, the parting direction of the mold can be set to the axial direction of the annular electrically insulating holder 33, and the two flat surfaces that are constituted by the long sides of the rectangular cross sections of the coil connecting terminals 32a and 32b and the external electric power supply terminals 32U, 32V, and 32W can be pressed by the mating surfaces and insert-molded. Because the two flat surfaces that are constituted by the long sides of the rectangular cross sections of the coil connecting terminals 32a and 32b and the external electric power supply terminals 32U, 32V, and 32W can thereby be insert molded as a sealing surface, sealing during insert molding is simplified.

The connecting unit 30 is disposed axially outside the concentrated winding coils 24, which are arranged annularly in a circumferential direction. Thus, the junction portions between the coil terminals 24a and 24b and the coil connecting terminals 32a and 32b are positioned radially outside the concentrated winding coils 24 where there is ample space for connecting work, improving work efficiency during joining. In addition, because it becomes possible to widen the radial width of the connecting unit 30 radially inward, and increase the sheet thickness of the busbars 31N, 31U, 31V, and 31W, increases in the supplied electric current can be accommodated easily without inviting increases in the size of the rotary electric machine 100.

Because the coil connecting terminals 32a and 32b and the external electric power supply terminals 32U, 32V, and 32W extend outward in radially opposite directions, jigs for connecting the coil connecting terminals 32a and 32b and jigs for connecting the external electric power supply terminals 32U, 32V, and 32W do not interfere with each other, improving work efficiency during joining.

Because the coil terminal guiding members 36 are mounted such that the coil terminals 24a and 24b are inserted through the splayed guiding apertures 36b from the splayed ends, the coil terminals 24a and 24b are guided by the splayed guiding apertures 36b to extend outward from the guiding portions 36a. Thus, the tip ends of the coil terminals 24a and 24b are arranged in a row circumferentially so as to lie alongside the tip ends of the coil connecting terminals 32a and 32b, simplifying the operation of joining the coil terminals 24a and 24b and the coil connecting terminals 32a and 32b.

Because the connecting unit 30 is mounted such that the cover 37 covers the junction portions between the coil terminals 24a and 24b and the coil connecting terminals 32a and 32b, electrical insulation is improved.

Moreover, in Embodiment 1 above, the busbar 31N is formed into an annular shape, but as shown in FIG. 15A, the busbar 31N may also be an incomplete annular shape that has an omitted portion. In addition, as shown in FIG. 15B, the busbar 31N may also be configured such that four circular arc-shaped base portions 31c that have three coil connecting terminals 32a are arranged in a circumferential direction.

Embodiment 2

Figure 16:
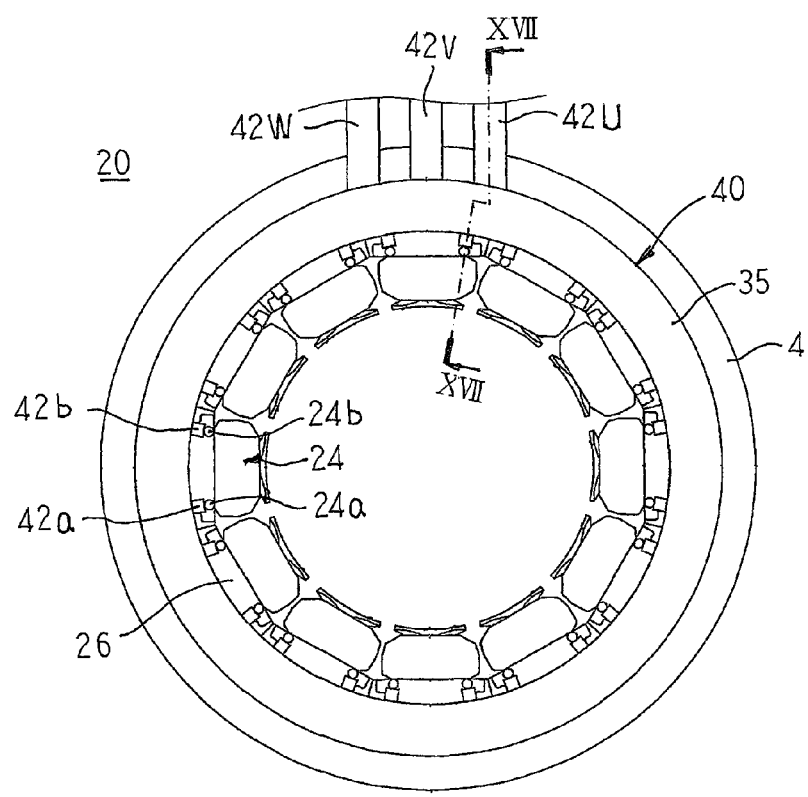
FIG. 16 is an end elevation that shows a mounted state of a connecting unit of a stator of a rotary electric machine according to Embodiment 2 of the present invention.
Figure 17:
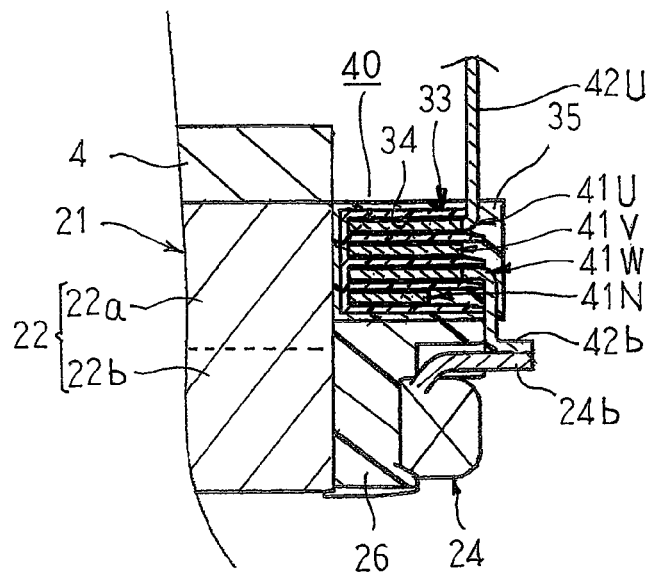
FIG. 17 is a cross section that is taken along Line XVII-XVII in FIG. 16 so as to be viewed in the direction of the arrows.
Figure 18:
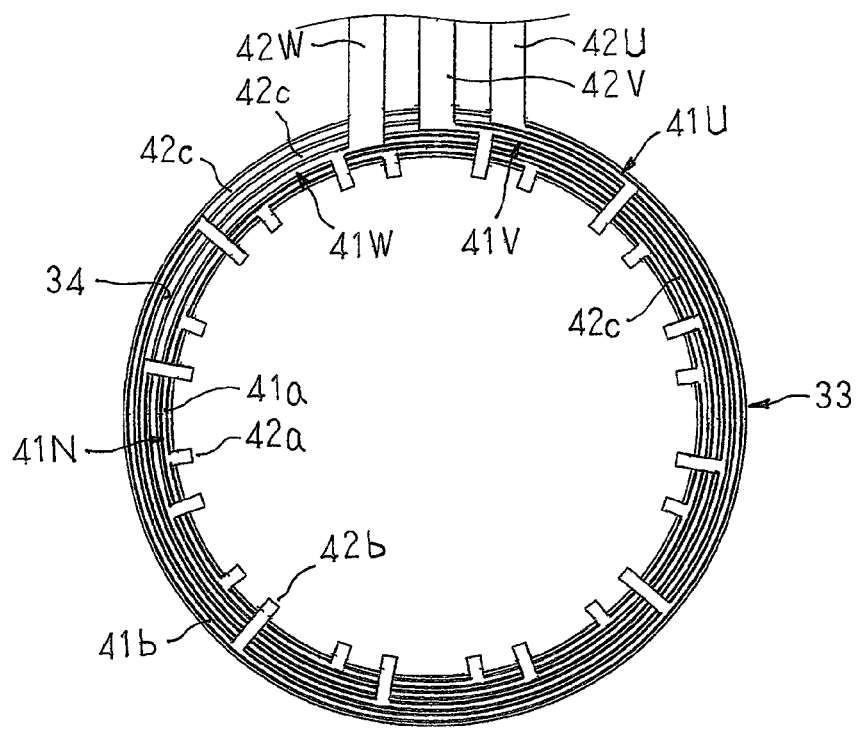
FIG. 18 is an end elevation that shows a state of the connecting unit of the stator coil of the rotary electric machine according to Embodiment 2 of the present invention before insert molding.

FIG. 16 is an end elevation that shows a mounted state of a connecting unit of a stator of a rotary electric machine according to Embodiment 2 of the present invention, FIG. 17 is a cross section that is taken along Line XVII-XVII in FIG. 16 so as to be viewed in the direction of the arrows, FIG. 18 is an end elevation that shows a state of the connecting unit of the stator coil of the rotary electric machine according to Embodiment 2 of the present invention before insert molding, and FIGS. 19A through 19D are end elevations that show busbars that are used in the connecting unit of the stator coil of the rotary electric machine according to Embodiment 2 of the present invention.

In FIGS. 16 through 18, a connecting unit 40 includes: a plurality of busbars 41N, 41U, 41V, and 41W that perform predetermined connection of concentrated winding coils 24; an electrically insulating holder 33 that houses and holds the plurality of busbars 41N, 41U, 41V, and 41W; and an exterior molded member 35 that is formed so as to embed the electrically insulating holder 33 in which the busbars 41N, 41U, 41V, and 41W are housed and held by insert molding.

Figure 19A:
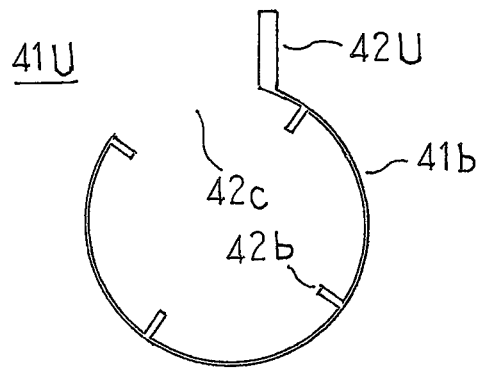
FIGS. 19A through 19D are end elevations that show busbars that are used in the connecting unit of the stator coil of the rotary electric machine according to Embodiment 2 of the present invention.

The busbar 41U is a U-phase connecting busbar, and as shown in FIG. 19A, includes: an incomplete annular base portion 41b that is formed by bending a flat strip in a thickness direction, and that has an omitted portion 42c from which a portion of a circular arc is omitted; four coil connecting terminals 42b that are respectively bent in the thickness direction from a first side in a width direction of the base portion 41b so as to extend radially inward and that are arranged at a uniform angular pitch circumferentially; and an external electric power supply terminal 42U that is bent in the thickness direction from the first side in the width direction of a first circumferential end of the base portion 41b to extend radially outward.

Figure 19B:
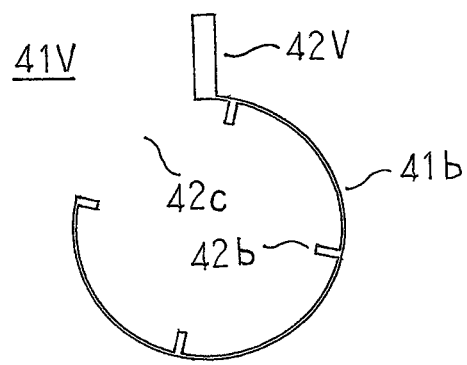

The busbar 41V is a V-phase connecting busbar, and as shown in FIG. 19B, includes: an incomplete annular base portion 41b that is smaller in diameter than the base portion 41b of the busbar 41U, that is formed by bending a flat strip in a thickness direction, and that has an omitted portion 42c from which a portion of a circular arc is omitted; four coil connecting terminals 42b that are respectively bent in the thickness direction from the first side in the width direction of the base portion 41b so as to extend radially inward and that are arranged at a uniform angular pitch circumferentially; and an external electric power supply terminal 42V that is bent in the thickness direction from the first side in the width direction of a first circumferential end of the base portion 41b to extend radially outward.

Figure 19C:
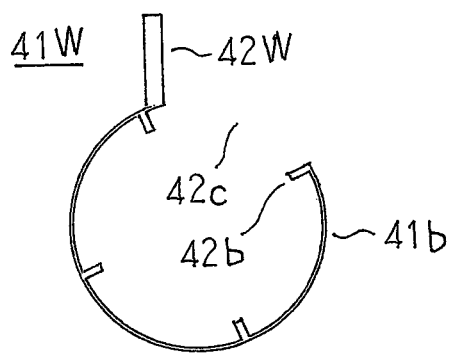

The busbar 41W is a W-phase connecting busbar, and as shown in FIG. 19C, includes: an incomplete annular base portion 41b that is smaller in diameter than the base portion 41b of the busbar 41V, that is formed by bending a flat strip in a thickness direction, and that has an omitted portion 32c from which a portion of a circular arc is omitted; four coil connecting terminals 42b that are respectively bent in the thickness direction from the first side in the width direction of the base portion 41b so as to extend radially inward and that are arranged at a uniform angular pitch circumferentially; and an external electric power supply terminal 42W that is bent in the thickness direction from the first side in the width direction of a first circumferential end of the base portion 41b to extend radially outward.

Figure 19D:
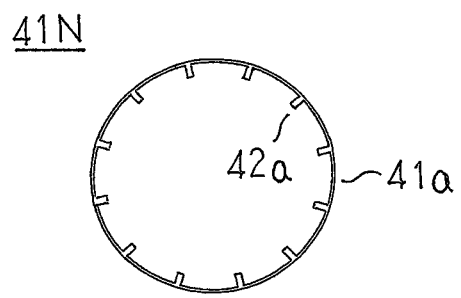

The busbar 41N is a neutral-point connecting busbar, and as shown in FIG. 19D, includes: an annular base portion 41a that is smaller in diameter than the base portion 41b of the busbar 41W, and that is formed by bending a flat strip in a thickness direction; and twelve coil connecting terminals 42a that are respectively bent in the thickness direction from the first side in the width direction of the base portion 41a so as to extend radially inward and that are arranged at a uniform angular pitch circumferentially.

Moreover, coil terminals 24a of the concentrated winding coils 24 are connected to the coil connecting terminals 42a, and coil terminals 24b are connected to the coil connecting terminals 42b.

Next, a method for manufacturing the connecting unit 40 will be explained.

First, the busbars 41U, 41V, 41W, and 41N are formed using a pressing machine from a strip-shaped electrically conductive member that is made from a copper sheet, etc., that has a sheet thickness of approximately 1 mm in a similar manner to the busbars 31U, 31V, 31W, and 31N.

The busbar 41N is mounted onto the electrically insulating holder 33 by inserting the base portion 41a thereof into the busbar housing groove 34 that is positioned at the innermost circumference. Next, the busbar 41W is mounted onto the electrically insulating holder 33 by inserting the base portion 41b thereof into the second busbar housing groove 34 from the inner circumferential side. Next, the busbar 41V is mounted onto the electrically insulating holder 33 by inserting the base portion 41b thereof into the third busbar housing groove 34 from the inner circumferential side such that the external electric power supply terminal 42W is inserted into the omitted portion 42c of the base portion 41b. In addition, the busbar 41U is mounted onto the electrically insulating holder 33 by inserting the base portion 41b thereof into the fourth busbar housing groove 34 from the inner circumferential side, i.e., at the innermost circumference, such that the external electric power supply terminals 42U and 42W are inserted into the omitted portion 42c of the base portion 41b.

The busbars 41N, 41U, 41V, and 41W are thereby assembled into the electrically insulating holder 33, as shown in FIG. 18. Thus, twelve pairs of coil connecting terminals 42a and 42b that extend radially inward from the electrically insulating holder 33 are arranged at a uniform angular pitch. The external electric power supply terminal 42W extends radially outward from the electrically insulating holder 33 so as to pass over the omitted portions 42c of the base portions 41b of the busbars 41U and 41V, and the external electric power supply terminal 42V extends radially outward from the electrically insulating holder 33 so as to pass over the omitted portion 42c of the base portion 41b of the busbar 41U.

Next, the electrically insulating holder 33 on which the busbars 41N, 41U, 41V, and 41W are assembled is inserted into a mold that has a parting direction in an axial direction of the electrically insulating holder 33. Two flat surfaces that are constituted by the long sides of the rectangular cross sections of the coil connecting terminals 42a and 42b and the external electric power supply terminal 42U, 42V, and 42W are held by mating surfaces of the mold, and the connecting unit 40 is formed by insert-molding using an electrically insulating resin such as a nylon. The electrically insulating holder 33, the base portions 41a and 41b, the root regions of the coil connecting terminals 42a and 42b and the root regions of the external electric power supply terminal 42U, 42V, and 42W are thereby embedded in the annular exterior molded member 35, the coil connecting terminals 42a and 42b extend radially inward from inner circumferential wall surfaces of the exterior molded member 35, and the external electric power supply terminals 42U, 42V, and 42W extend radially outward from outer circumferential wall surfaces of the exterior molded member 35. In addition, the two flat surfaces that are constituted by the long sides of the rectangular cross sections of the coil connecting terminals 42a and 42b and the external electric power supply terminals 42U, 42V, and 42W that extend out from the exterior molded member 35 are flush with each other.

A procedure for connecting the concentrated winding coils 24 of the stator 20 using a connecting unit 40 that is configured in this manner will be explained.

First, the connecting unit 40 is moved toward the first axial end surface of the stator 20 from an axial direction such that the coil connecting terminals 42a and 42b are positioned circumferentially so as to face the coil terminals 24a and 24b. Thus, as shown in FIGS. 16 and 17, the connecting unit 40 is disposed axially outside the stator core 21 and radially outside the concentrated winding coils 24 so as to be in contact with the core back portions 22a. Here, the connecting unit 40 is positioned radially outside the teeth 22b of the stator core 21.

Next, the coil terminals 24a and 24b and the coil connecting terminals 42a and 42b are joined by welding, etc., to join the connecting unit 40 to the first axial end of the stator 20. Thus, the twelve concentrated winding coils 24 are connected by the connecting unit 40, and are configured into a three-phase alternating-current winding that is formed by wye-connecting a U-phase winding, a V-phase winding, and a W-phase winding in each of which four concentrated winding coils 24 are connected in parallel, in a similar manner to Embodiment 1.

Moreover, although the coil terminal guiding members 36 and the cover 37 have not been used, it goes without saying that the coil terminal guiding members 36 and the cover 37 may also be used.

In Embodiment 2, the busbar 41N is mounted onto the electrically insulating holder 33 by inserting the base portion 41a into the busbar housing groove 34 at the innermost circumference of the electrically insulating holder 33, and then the busbar 41W is mounted onto the electrically insulating holder 33 by inserting the base portion 41b into the second busbar housing groove 34 from the inner circumferential side. Next, the busbar 41V is mounted onto the electrically insulating holder 33 by inserting the base portion 41b into the third busbar housing groove 34 from the inner circumferential side such that the external electric power supply terminal 42W of the busbar 41W that is already mounted is inserted into the omitted portion 42c of the base portion 41b. In addition, the busbar 41U is mounted onto the electrically insulating holder 33 by inserting the base portion 41b thereof into the fourth busbar housing groove 34 from the inner circumferential side such that the external electric power supply terminals 42V and 42W of the busbars 41V and 41W that are already mounted are inserted into the omitted portion 42c of the base portion 41b.

According to this assembly procedure, the busbars 41N, 41U, 41V, and 41W, in which the coil connecting terminals 42a and 42b are bent radially inward, and the external electric power supply terminals 42U, 42V, and 42W are bent radially outward, can be mounted onto the electrically insulating holder 33 without interfering with each other. Thus, complicated bending steps in which the coil connecting terminals 42a and 42b or the external electric power supply terminals 42U, 42V, and 42W are bent after mounting the busbars 41N, 41U, 41V, and 41W into the electrically insulating holder 33, and jigs that are used in the bending steps, etc., are no longer necessary, improving assembly of the connecting unit 40, and enabling costs to be reduced.

Because the coil connecting terminals 42a and 42b and the external electric power supply terminals 42U, 42V, and 42W are bent before the busbars 41N, 41U, 41V, and 41W are mounted onto the electrically insulating holder 33, dimensional precision of the bent portions is increased.

The coil connecting terminals 42a and 42b and the external electric power supply terminals 42U, 42V, and 42W are bent perpendicular to the thickness directions of the base portions 41a and 41b. Thus, the parting direction of the mold can be set to the axial direction of the annular electrically insulating holder 33, and the two flat surfaces that are constituted by the long sides of the rectangular cross sections of the coil connecting terminals 42a and 42b and the external electric power supply terminals 42U, 42V, and 42W can be pressed by the mating surfaces and insert-molded. Because the two flat surfaces that are constituted by the long sides of the rectangular cross sections of the coil connecting terminals 42a and 42b and the external electric power supply terminals 42U, 42V, and 42W can thereby be insert molded as a sealing surface, sealing during insert molding is simplified.

Because the connecting unit 40 is disposed radially outside the concentrated winding coils 24, which are arranged annularly in a circumferential direction, the external electric power supply terminals 42U, 42V, and 42W that are bent radially outward from the base portions 41b can be connected directly to an external electric power supply (not shown) simply by being extended outside the cylindrical frame 4. Thus, axial dimensions of the rotary electric machine can be reduced, and connecting wiring, etc., between the external electric power supply and the external electric power supply terminals 42U, 42V, and 42W is also no longer required, enabling the number of parts to be reduced.

Moreover, in each of the above embodiments, a ratio between a magnetic pole count and a slot count in the rotary electric machine is 8:12, i.e., a pole-to-slot ratio is 2:3, but the pole-to-slot ratio is not limited to 2:3, and may also be 4:3, for example.

What is claimed is:
1. A rotary electric machine comprising:
   a housing comprising:
      a cylindrical frame; and
      a pair of brackets that are disposed on two axial ends of said cylindrical frame;
   a rotor that is disposed inside said housing such that a shaft is rotatably supported by said pair of brackets;
   a stator comprising:
      a stator core in which a plurality of teeth are each disposed so as to project radially inward from an inner circumferential wall surface of an annular core back, and are arranged in a row at a predetermined pitch circumferentially; and
      a stator coil that is constituted by a plurality of concentrated winding coils that are wound onto each of said teeth,
      said stator being held by said cylindrical frame so as to surround said rotor; and
   a connecting unit that is disposed at a first axial end of said stator, that performs predetermined connection of said plurality concentrated winding coils,
   wherein:
   said connecting unit comprises:
      a plurality of busbars each comprising:
         a base portion that has a rectangular cross section that is formed by bending a flat strip in a thickness direction into an incomplete annular shape from which a portion of a circular arc is omitted;
         an external electric power supply terminal that has a rectangular cross section that is bent in said thickness direction from a first side in a width direction of a circumferential end portion of said base portion to extend outward on a first side in a radial direction; and a plurality of coil connecting terminals that have rectangular cross sections that are each bent in said thickness direction from said first side in said width direction of said base portion to extend outward on a second side in said radial direction, that are arranged in a row so as to have a predetermined spacing in a circumferential direction of said base portion, and that are connected to coil terminals of said concentrated winding coils, said plurality of busbars being disposed so as to correspond respective phases of said stator coil; and an annular electrically insulating holder in which a plurality of busbar housing grooves are formed concentrically, and that holds said plurality of busbars by housing said base portions in each of said plurality of busbar housing grooves; and an exterior molded member that embeds said electrically insulating holder and said base portions of said plurality of busbars, wherein said plurality of busbars are held by said electrically insulating holder such that said external electric power supply terminals extend outward on said first side in said radial direction so as to pass over said omitted portions of said base portions of said busbars that are positioned on said first side in said radial direction of said electrically insulating holder, wherein said plurality of coil connecting terminals of said plurality of busbars extend radially outward from said first sides in said width directions of said base portions, wherein said connecting unit is disposed axially outside said concentrated winding coils, and said plurality of coil connecting terminals are respectively joined to corresponding coil terminals of said concentrated winding coils, and wherein two flat surfaces that are constituted by long sides of said rectangular cross sections of said plurality of coil connecting terminals and said external electric power supply terminals that extend outward from said exterior molded member are flush with each other.

2. A rotary electric machine comprising:
a housing comprising;
    a cylindrical frame; and
    a pair of brackets that are disposed on two axial ends of said cylindrical frame;
a rotor that is disposed inside said housing such that a shaft is rotatably supported by said pair of brackets;
a stator comprising:
    a stator core in which a plurality of teeth are each disposed so as to project radially inward from an inner circumferential wall surface of an annular core back, and are arranged in a row at a predetermined pitch circumferentially; and
    a stator coil that is constituted by a plurality of concentrated winding coils that are wound onto each of said teeth,
    said stator being held by said cylindrical frame so as to surround said rotor; and
a connecting unit that is disposed at a first axial end of said stator, and that performs predetermined connection of said plurality of concentrated winding coils, wherein:
said connecting unit comprises:
    a plurality of busbars each comprising:
        a base portion that has a rectangular cross section that is formed by bending a flat strip in a thickness direction into an incomplete annular shape from which a portion of a circular arc is omitted;
        an external electric power supply terminal that has a rectangular cross section that is bent in said thickness direction from a first side in a width direction of a circumferential end portion of said base portion to extend outward on a first side in a radial direction; and
        a plurality of coil connecting terminals that have rectangular cross sections that are each bent in said thickness direction from said first side in said width direction of said base portion to extend outward on a second side in said radial direction, that are arranged in a row so as to have a predetermined spacing in a circumferential direction of said base portion, and that are connected to coil terminals of said concentrated winding coils,
    said plurality of busbars being disposed so as to correspond respective phases of said stator coil;
    an annular electrically insulating holder in which a plurality of busbar housing grooves are formed concentrically, and that holds said plurality of busbars by housing said base portions in each of said plurality of busbar housing grooves; and
    an exterior molded member that embeds said electrically insulating holder and said base portions of said plurality of busbars,
wherein said plurality of busbars are held by said electrically insulating holder such that said external electric power supply terminals extend outward on said first aide radial direction so as to pass over said omitted portions of said base portions of said busbars that are positioned on said first side in said radial direction of said electrically insulating holder,
wherein said plurality of coil connecting terminals of said plurality of busbars extend radially outward from said first sides in said width directions of said base portions,
wherein said connecting unit is disposed axially outside said concentrated winding coils, and said plurality of coil connecting terminals are respectively joined to corresponding coil terminals of said concentrated winding coils, and
wherein two flat surfaces that are constituted by long sides of said rectangular cross sections of said plurality of coil connecting terminals and said external electric power supply terminals that extend outward from said exterior molded member are flush with each other.

3. A rotary electric machine comprising:
a housing comprising:
    a cylindrical frame; and
    a pair of brackets that are disposed on two axial ends of said cylindrical frame:
a rotor that is disposed inside said housing such that a shaft is rotatably supported by said pair of brackets;
a stator comprising:
    a stator core in which a plurality of teeth are each disposed so as to project radially inward from an inner circumferential wall surface of an annular core back, and are arranged in a row at a predetermined pitch circumferentially; and a stator coil that is constituted by a plurality of concentrated winding coils that are wound onto each of said teeth, said stator being held by said cylindrical frame so as to surround said rotor; and a connecting unit that is disposed at a first axial end of said stator, and that performs predetermined connection of said plurality of concentrated winding coils, wherein:

said connecting unit comprises:

a plurality of busbars each comprising:

a base portion that has a rectangular cross section that is formed by bending a flat strip in a thickness direction into an incomplete annular shape from which a portion of a circular arc is omitted;

an external electric power supply terminal that has a rectangular cross section that is bent in said thickness direction from a first side in a width direction of a circumferential end portion of said base portion to extend outward on a first side in a radial direction; and a plurality of coil connecting terminals that have rectangular cross sections that are each bent in said thickness direction from said first side in said width direction of said base portion to extend outward on a second side in said radial direction, that are arranged in a row so as to have a predetermined spacing in a circumferential direction of said base portion, and that are connected to coil terminals of said concentrated winding coils, said plurality of busbars being disposed so as to correspond respective phases of said stator coil;

an annular electrically insulating holder in which a plurality of busbar housing grooves are formed concentrically, and that holds said plurality of busbars by housing said base portions in each of said plurality of busbar housing grooves; and a coil terminal guiding member that comprises:

a plurality of guiding portions that comprise splayed guiding apertures, and that are mounted onto each of said coil terminals such that said coil terminals are inserted through said guiding apertures by being inserted from a splayed end; and an annular linking portion that links and holds said plurality of guiding portions integrally; and said plurality of busbars are held by said electrically insulating holder such that said external electric power supply terminals extend outward on said first side in said radial direction so as to pass over said omitted portions of said base portions of said busbars that are positioned on said first side in said radial direction of said electrically insulating holder.

4. A rotary electric machine comprising:

a housing comprising:

a cylindrical frame; and a pair of brackets that are disposed on two axial ends of said cylindrical frame;

a rotor that is disposed inside said housing such that a shaft is rotatably supported by said pair of brackets;

a stator comprising:

a stator core in which a plurality of teeth are each disposed so as to project radially inward from an inner circumferential wall surface of an annular core back, and are arranged in a row at a predetermined pitch circumferentially; and a stator coil that is constituted by a plurality of concentrated winding coils that are wound onto each of said teeth, said stator being held by said cylindrical frame so as to surround said rotor; and a connecting unit that is disposed at a first axial end of said stator, and that performs predetermined connection of said plurality of concentrated winding coils, wherein:

said connecting unit comprises:

a plurality of busbars each comprising:

abase portion that has a rectangular cross section that is formed by bending a flat strip in a thickness direction into an incomplete annular shape from which a portion of a circular arc is omitted;

an external electric power supply terminal that has a rectangular cross section that is bent in said thickness direction from a first side in a width direction of a circumferential end portion of said base portion to extend outward on a first side in a radial direction; and a plurality of coil connecting terminals that have rectangular cross sections that are each bent in said thickness direction from said first side in said width direction of said base portion to extend outward on a second side in said radial direction, that are arranged in a row so as to have a predetermined spacing in a circumferential direction of said base portion, and that are connected to coil terminals of said concentrated winding coils, said plurality of busbars being disposed so as to correspond respective phases of said stator coil;

an annular electrically insulating holder in which a plurality of busbar housing grooves are formed concentrically, and that holds said plurality of busbars by housing said base portions in each of said plurality of busbar housing grooves; and a cover that is mounted to said connecting unit so as to cover connected portions between said coil terminals and said coil connecting terminals; and said plurality of busbars are held by said electrically insulating holder such that said external electric power supply terminals extend outward on said first side in said radial direction so as to pass over said omitted portions of said bas portions of said busbars that are positioned on said first side in said radial direction of said electrically insulating holder.

5. A method for manufacturing a stator coil connecting unit for a rotary electric machine comprising:

a plurality of busbars each comprising:

a base portion that has a rectangular cross section that is formed by bending a flat strip in a thickness direction into an incomplete annular shape from which a portion of a circular arc is omitted;

an external electric power supply terminal that has a rectangular cross section that is bent in said thickness direction from a first side in a width direction of a circumferential end portion of said base portion to extend outward on a first side in a radial direction; and a plurality of coil connecting terminals that have rectangular cross sections that are each bent in said thickness direction from said first side in said width direction of said base portion to extend outward on a second side in said radial direction, that are arranged in a row so as to have a predetermined spacing in a circumferential direction of said base portion, and that are connected to coil terminals of concentrated winding coils that constitute a stator coil, said plurality of busbars being disposed so as to correspond respective phases of said stator coil; and an annular electrically insulating holder in which a plurality of busbar housing grooves are formed concentrically, and that holds said plurality of busbars by housing said base portions in each of said plurality of busbar housing grooves, said method for manufacturing a stator coil connecting unit for a rotary electric machine comprising:

a step of forming said plurality of busbars;

a step of mounting said plurality of busbars onto said electrically insulating holder by housing said base portions of said plurality of busbars in said busbar housing grooves sequentially from a busbar that is positioned on a second side in a radial direction of said electrically insulating holder, wherein said external electric power supply terminals that extend outward on said first sides in said radial direction from base portions of said busbars that are housed in said busbar housing grooves on said second side in said radial direction are inserted into said omitted portions of said base portions; and a step of insert molding said electrically insulating holder to which said plurality of busbars are mounted such that a parting direction of a mold is set to an axial direction of said electrically insulating holder, and two flat surfaces that are constituted by lon sides of said rectangular cross sections of said plurality of coil connecting terminals and said external electric power supply terminals that extend radially outward from said electrically insulating holder are pressed by mating surfaces of said mold.

* * * * *